United States Patent
Kwon et al.

(10) Patent No.: US 11,251,445 B2
(45) Date of Patent: Feb. 15, 2022

(54) SYSTEM FOR ESTIMATING AMOUNT OF PURGE OF FUEL CELL, AND SYSTEM AND METHOD FOR ESTIMATING HYDROGEN CONCENTRATION OF FUEL CELL USING THE SAME

(71) Applicants: Hyundai Motor Company, Seoul (KR); Kia Motors Corporation, Seoul (KR)

(72) Inventors: Soon Woo Kwon, Gyeonggi-do (KR); Ik Jae Son, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 77 days.

(21) Appl. No.: 16/693,255

(22) Filed: Nov. 23, 2019

(65) Prior Publication Data
US 2021/0020968 A1    Jan. 21, 2021

(30) Foreign Application Priority Data
Jul. 15, 2019   (KR) .................. 10-2019-0085103

(51) Int. Cl.
*H01M 8/04089* (2016.01)
(52) U.S. Cl.
CPC .... *H01M 8/04104* (2013.01); *H01M 2250/20* (2013.01)
(58) Field of Classification Search
None
See application file for complete search history.

(56) References Cited

U.S. PATENT DOCUMENTS

| | | | |
|---|---|---|---|
| 2003/0168337 A1* | 9/2003 | Mizutani | H01M 8/04783 204/424 |
| 2006/0188765 A1* | 8/2006 | Matsuzaki | H01M 8/04559 429/429 |

FOREIGN PATENT DOCUMENTS

| | | |
|---|---|---|
| KR | 101459815 B1 | 11/2014 |
| KR | 10-2019-0070205 A | 6/2019 |
| KR | 10-2019-0108293 A | 9/2019 |
| KR | 10-2019-0108304 A | 9/2019 |
| KR | 10-2020-0050508 A | 5/2020 |

* cited by examiner

*Primary Examiner* — Alix E Eggerding
(74) *Attorney, Agent, or Firm* — Mintz Levin Cohn Ferris Glovsky and Popeo, P.C.; Peter F. Corless

(57) ABSTRACT

A system for estimating purge of a fuel cell includes the fuel cell for generating power by receiving hydrogen at an anode side, and receiving oxygen at a cathode side, a recirculation line connected with the anode side of the fuel cell, and in which gas containing hydrogen therein is circulated, a purge valve positioned in the recirculation line, and for discharging the gas in the recirculation line to outside as the purge valve is opened, a differential pressure calculator for calculating a differential pressure between a front end and a rear end of the purge valve, a speed estimator for estimating a current gas diffusion speed in the recirculation line, and a purge amount estimator for estimating the amount of purge through the purge valve by using the differential pressure calculated by the differential pressure calculator and the gas diffusion speed estimated by the speed estimator.

17 Claims, 2 Drawing Sheets

SYSTEM FOR ESTIMATING AMOUNT OF PURGE OF FUEL CELL, AND SYSTEM AND METHOD FOR ESTIMATING HYDROGEN CONCENTRATION OF FUEL CELL USING THE SAME

CROSS REFERENCE TO RELATED APPLICATION

The present application claims under 35 U.S.C. § 119(a) the benefit of Korean Patent Application No. 10-2019-0085103 filed on Jul. 15, 2019, the entire contents of which are incorporated by reference herein.

BACKGROUND

(a) Technical Field

The present disclosure relates to a system for estimating an amount of purge of a fuel cell, and a system and a method for estimating hydrogen concentration using the same, more particularly, to estimating the amount of purge discharged to outside from an anode side of the fuel cell, and estimating the hydrogen concentration supplied to a fuel cell stack using the same.

(b) Description of the Related Art

A fuel cell converts chemical energy into electric energy by using an oxidation and reduction reaction of hydrogen and oxygen supplied from a hydrogen supply apparatus and an air supply apparatus, respectively, and includes a fuel cell stack for producing electric energy and a cooling system for cooling the fuel cell stack, etc.

That is, hydrogen is supplied to an anode side of the fuel cell, and the oxidation reaction of hydrogen is performed at the anode to generate hydrogen ions (protons) and electrons, and the generated hydrogen ions and electrons are transmitted to a cathode through an electrolyte membrane and a separator plate, respectively. At the cathode, water is generated through an electrochemical reaction involving the hydrogen ions and electrons moving from the anode and oxygen in the air, and electric energy is generated from a flow of the electrons.

Since the hydrogen supplied to the anode side of the fuel cell should maintain a proper level of hydrogen concentration, a proper hydrogen purge control is performed in a hydrogen recirculation line. The hydrogen purge control generally estimates the hydrogen concentration in real time, and accordingly, performs the hydrogen purge control so as to maintain the proper level of the hydrogen concentration.

Conventionally, since there is no suitable method capable of directly estimating the hydrogen concentration at the anode side of the fuel cell stack, a method for defining a value obtained by integrating the output current of the fuel cell with time and multiplying a weighting factor as Q, and performing a purge when the Q value reaches a reference value that has been experimentally tuned has been used to control the hydrogen concentration of the anode side of the fuel cell stack (current accumulation control).

However, in the conventional purge control method, there has been a problem in that the relationship between the hydrogen concentration, which is an actual control object, and the Q value is not clear, and accordingly, the reference of the target hydrogen concentration or the target hydrogen pressure is not clear, and thus hydrogen concentration control is not optimally performed.

In particular, there has been a problem in that it is not possible to accurately estimate the amount of purge of gas discharged to the outside, nor to reflect the amount of purge of the gas changed according to the gas temperature or the gas concentration by opening a purge valve of the anode side.

The foregoing explained as the background is intended merely to aid in the understanding of the background of the present disclosure, and is not intended to mean that the present disclosure falls within the purview of the related art that is already known to those skilled in the art.

SUMMARY

The present disclosure provides a technique for accurately estimating an amount of purge discharged from an anode side of a fuel cell by reflecting a temperature and concentration of hydrogen gas, and estimating a hydrogen concentration of the anode side by using the same.

A system for estimating an amount of purge of a fuel cell including the fuel cell for generating power by receiving hydrogen at an anode side, and receiving oxygen at a cathode side, a recirculation line connected with the anode side of the fuel cell, and in which gas comprising the hydrogen therein is circulated, a purge valve positioned in the recirculation line, and for discharging the gas in the recirculation line to an outside as the purge valve is opened, a differential pressure calculator for calculating a differential pressure between a front end and a rear end of the purge valve, a speed estimator for estimating a current gas diffusion speed in the recirculation line, and a purge amount estimator for estimating the amount of purge through the purge valve by using the differential pressure calculated by the differential pressure calculator and the gas diffusion speed estimated by the speed estimator.

The speed estimator may estimate the current gas diffusion speed by multiplying a reference gas diffusion speed at a predetermined temperature and the square root of a ratio of a current gas temperature to a predetermined temperature.

The speed estimator may estimate the current gas diffusion speed by dividing a reference gas diffusion speed at a predetermined average molecular weight and the square root of a ratio of a current average molecular weight to a predetermined average molecular weight.

The current average molecular weight may be estimated by using the concentration for each gas and the molecular weight for each gas in the recirculation line.

The purge amount estimator may estimate the amount of purge as being proportional to a purge rate with time calculated by multiplying the differential pressure by a purge gain, and modifies the purge gain so as to reflect the current gas diffusion speed estimated by the speed estimator to a predetermined gain.

A system for estimating an amount of purge of a fuel cell may further include a purge controller for controlling an opening period, an opening degree, or an opening holding time of the purge valve based on the amount of purge estimated by the purge amount estimator.

A system for estimating hydrogen concentration of a fuel cell according to the present disclosure includes the fuel cell for generating power by receiving hydrogen at an anode side, and receiving oxygen at a cathode side, a recirculation line connected with the anode side of the fuel cell, and in which gas comprising the hydrogen therein is circulated, a purge valve positioned in the recirculation line, and for discharging the gas in the recirculation line to an outside as the purge valve is opened, a differential pressure calculator for calculating a differential pressure between a front end and a rear end of the purge valve, a speed estimator for estimating a current gas diffusion speed in the recirculation line, a purge amount estimator for estimating the amount of purge through the purge valve by using the differential pressure calculated by the differential pressure calculator and the gas diffusion speed estimated by the speed estimator, and a concentration estimator for estimating hydrogen concentration in the recirculation line based on the amount of purge estimated by the purge amount estimator.

The concentration estimator may estimate hydrogen concentration in the recirculation line based on the total amount of gas in the recirculation line, the amount of crossover crossed-over between the anode side and the cathode side of the fuel cell, and the amount of purge purged to the outside through the purge valve.

The system for estimating hydrogen concentration of the fuel cell may further include a purge controller for controlling an opening period, an opening degree, or an opening holding time of the purge valve based on the hydrogen concentration estimated by the concentration estimator.

A method for estimating hydrogen concentration of a fuel cell according to the present disclosure includes estimating a current gas diffusion speed in a recirculation line for circulating the gas containing hydrogen therein to an anode side of a fuel cell, estimating the amount of purge through a purge valve connected to the outside in the recirculation line by reflecting the estimated current gas diffusion speed, and estimating hydrogen concentration in the recirculation line based on the estimated amount of purge.

The estimating the current gas diffusion speed may estimate the current gas diffusion speed by multiplying a reference gas diffusion speed at a predetermined temperature and the square root of a ratio of a current gas temperature to a predetermined temperature.

The estimating the current gas diffusion speed may estimate the current gas diffusion speed by dividing a reference gas diffusion speed at a predetermined average molecular weight and the square root of a ratio of a current average molecular weight to a predetermined average molecular weight.

The current average molecular weight may be estimated by using the concentration for each gas and the molecular weight for each gas in the recirculation line.

The estimating the amount of purge may estimate the amount of purge as being proportional to a purge rate with time calculated by multiplying the differential pressure by a purge gain, and modifies the purge gain so as to reflect the current gas diffusion speed estimated by the speed estimator to a predetermined gain.

The estimating the hydrogen concentration may estimate hydrogen concentration in the recirculation line based on the total amount of gas in the recirculation line, the amount of crossover crossed-over between the anode side and a cathode side of the fuel cell, and the amount of purge purged to the outside through the purge valve.

The estimating the hydrogen concentration may estimate the amount of hydrogen in the recirculation line by reducing the amount of nitrogen and the amount of vapor having reflected the amount of crossover and the amount of purge from the total amount of gas in the recirculation line.

The method for estimating hydrogen concentration of the fuel cell may further include controlling, after the estimating the hydrogen concentration, an opening period, an opening degree, or an opening holding time of the purge valve based on the estimated amount of purge or the estimated hydrogen concentration.

It is possible to estimate the amount of purge by reflecting the gas diffusion speed changed according to the condition of the present disclosure, thereby estimating more accurate amount of purge.

In addition, accordingly, it is possible to estimate the hydrogen concentration in the recirculation line more accurately.

In addition, accordingly, it is possible to control the hydrogen supply system so as to maintain the hydrogen concentration in the recirculation line at the target concentration by using the accurate hydrogen concentration, thereby enhancing fuel economy and durability.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Figure 1:
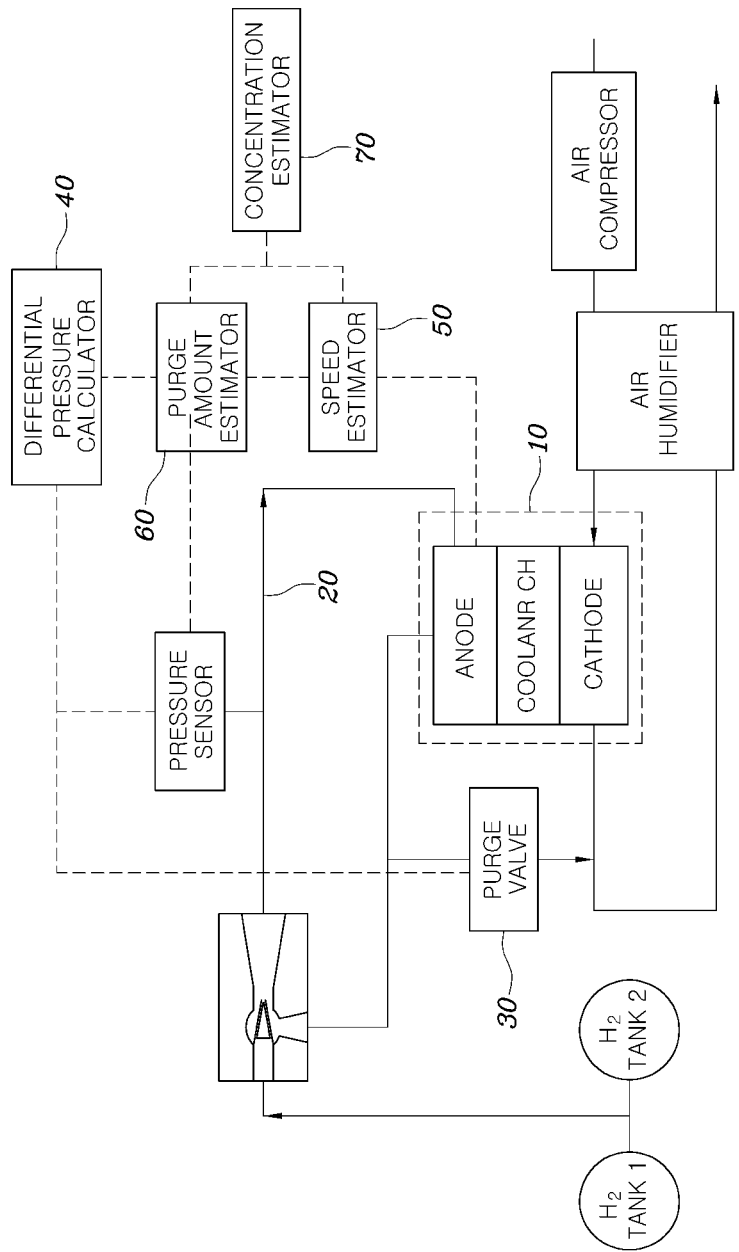
FIG. 1 is a block diagram illustrating a system for estimating an amount of purge of a fuel cell and a system for estimating hydrogen concentration of the fuel cell using the same according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Specific structural and functional descriptions of the embodiments of the present disclosure disclosed in the specification or application are only for the purpose of illustrating the embodiments of the present disclosure, and the embodiments in accordance with the present disclosure may be embodied in various forms and should not be construed as limited to the embodiments set forth in the specification or application.

Various modifications and various forms may be made in the embodiments according to the present disclosure, so that specific embodiments are illustrated in the drawings and described in detail in the specification or application. It should be understood, however, that it is not intended to limit the embodiments in accordance with the concepts of the present disclosure to the particular disclosed forms, but includes all modifications, equivalents, and alternatives falling within the sprit and technical scope of the present disclosure.

The terms "first" and/or "second," and the like may be used to illustrate various components, but the components should not be limited by the terms. The terms are used to differentiate one element from another, for example, a first component may be referred to as a second component, and similarly, the second component may be also referred to as the first component without departing from claims in accordance with the concepts of the present disclosure.

It will be understood that when an element is referred to as being "connected" or "coupled" to another element, it may be "directly connected" or "coupled" to the other element, but also to the other element with other elements interposed therebetween. On the other hand, it should be understood that any configuration element has no other element in between the time stated that "directly connected" or "directly coupled" to another element. Other expressions that describe the relationship between elements, such as "between" and "directly between" or "adjacent to" and "directly adjacent to" should be interpreted as well.

Unless otherwise defined, all terms including technical and scientific terms used herein have the same meaning as commonly understood by one of ordinary skill in the art to which the present disclosure belongs. It will be further understood that terms, such as those defined in commonly used dictionaries, should be additionally interpreted as having a meaning that is consistent with their meaning in the context of the relevant art, and will not be interpreted in an idealized or overly formal sense unless expressly so defined in the specification.

Hereinafter, the present disclosure will be described in detail by describing preferred embodiments of the present disclosure with reference to the accompanying drawings. The same reference numerals indicated in each drawing denote the same members.

Figure 2:
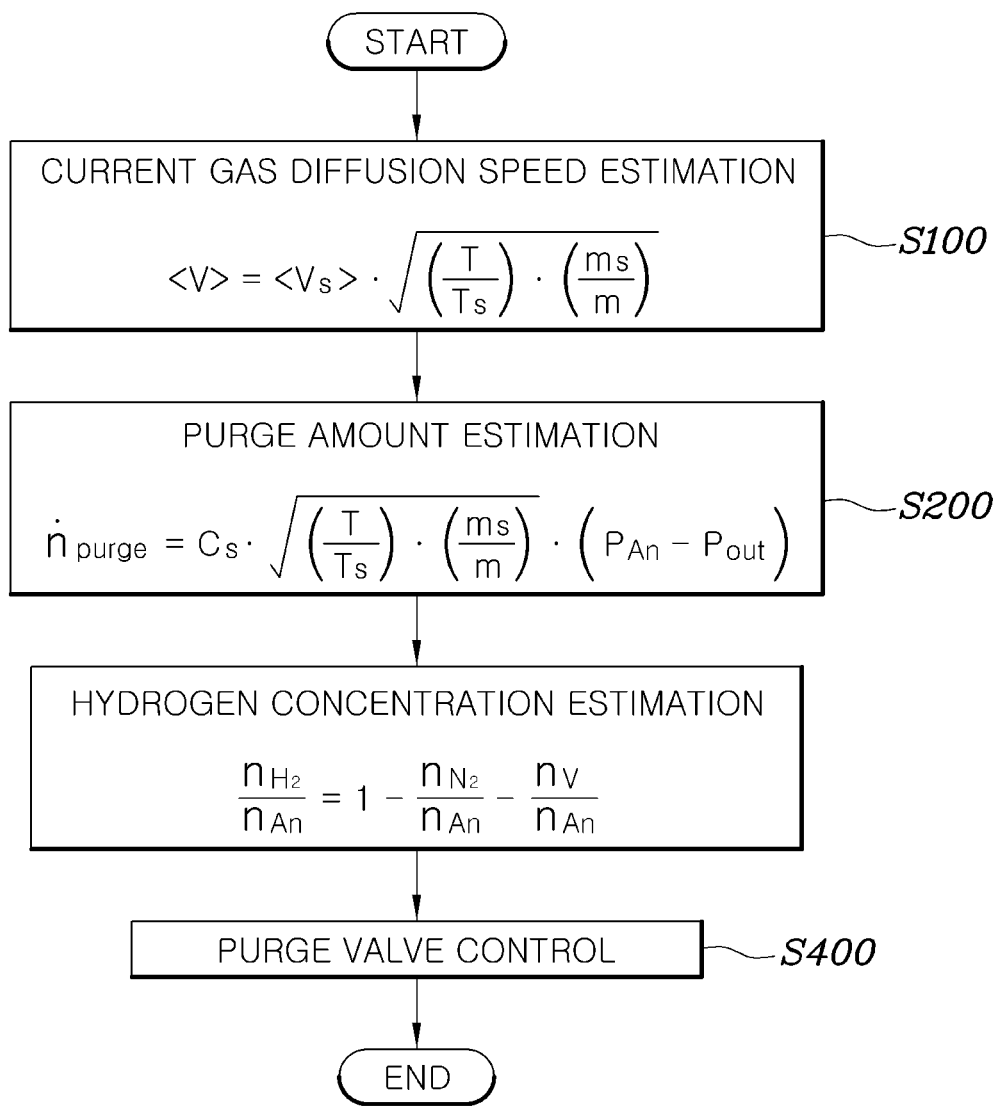
FIG. 2 is a flowchart illustrating a method for estimating hydrogen concentration of the fuel cell according to an embodiment of the present disclosure.

FIG. 1 is a block diagram illustrating a system for estimating an amount of purge of a fuel cell 10 and a system for estimating hydrogen concentration of the fuel cell 10 using the same according to an embodiment of the present disclosure, and FIG. 2 is a flowchart illustrating a method for estimating hydrogen concentration of the fuel cell 10 according to an embodiment of the present disclosure.

Referring to FIGS. 1 and 2, a system for estimating the amount of purge of a fuel cell 10 according to an embodiment of the present disclosure includes the fuel cell 10 for generating power by receiving hydrogen at an anode 11 side, and receiving oxygen at a cathode 12 side; a recirculation line 20 connected to the anode 11 side of the fuel cell 10, and in which gas having hydrogen contained therein is circulated; a purge valve 30 for discharging the gas in the recirculation line 20 to an outside (i.e., outside of the fuel cell 10, the system, and/or a vehicle) as the purge valve 30 is opened; a differential pressure calculator 40 for calculating a differential pressure between a front end and a rear end of the purge valve 30; a speed estimator 50 for estimating a current gas diffusion speed in the recirculation line 20; and a purge amount estimator 60 for estimating the amount of purge through the purge valve 30 by using the differential pressure calculated by the differential pressure calculator 40 and the gas diffusion speed estimated by the speed estimator 50.

The fuel cell 10 is a stack of the fuel cell 10 including a Membrane Electrode Assembly (MEA) therein, and generates electric energy by mutual chemical reaction between oxygen and hydrogen therein.

Specifically, a gas containing hydrogen may be supplied to the anode 11 side of the fuel cell 10, and a gas such as air containing oxygen may be supplied to the cathode 12 side of the fuel cell 10.

The recirculation line 20 is connected to the anode 11 side of the fuel cell 10 to supply hydrogen to the fuel cell 10 stack. In particular, it is connected so that the gas containing the hydrogen discharged to an outlet through the fuel cell 10 is recirculated to an inlet of the fuel cell 10 again.

The purge valve 30 is positioned at the outlet side of the fuel cell 10 in the recirculation line 20. According to the purge control in which the purge valve 30 is opened, the gas containing hydrogen in the recirculation line 20 is discharged to the outside. According to the purge control, the gas containing impurities in the recirculation line 20 may be discharged to the outside, and pure hydrogen may be supplied from a hydrogen tank to maintain the hydrogen concentration in the recirculation line 20.

The differential pressure calculator 40 may calculate the differential pressure between the front end and the rear end of the purge valve 30 by subtracting a rear end pressure from a front end pressure of the purge valve 30. Specifically, the front end of the purge valve 30 is positioned at the anode 11 side, and it is possible to measure the front end pressure of the purge valve 30 by using a pressure sensor prepared in the recirculation line 20. In addition, the rear end of the purge valve 30 may be connected to the outside of the vehicle, or connected to the outlet of the cathode 12 side.

The speed estimator 50 may estimate the diffusion speed of the gas contained in the recirculation line 20. The amount of purge discharged through the purge valve 30 may be affected by the gas diffusion speed. In particular, a faster gas diffusion speed may allow more gas to be discharged under the same condition. Accordingly, the speed estimator 50 may estimate the gas diffusion speed in the recirculation line 20.

The purge amount estimator 60 may estimate the amount of purge by using the differential pressure and the gas diffusion speed. Specifically, the purge amount estimator 60 may calculate the amount of purge by multiplying the purge rate with time by the time, and the purge rate with time may be calculated by multiplying the differential pressure by a purge gain.

Here, the purge gain may be a value predetermined by a purge period, the opening of the purge valve 30 and the opening time of the purge valve at the time of purge. The purge amount estimator 60 may reflect the gas diffusion speed changed according to the temperature or the average molecular weight to the purge gain.

Accordingly, according to the present disclosure, it is possible to reflect the gas diffusion speed changed according to the condition to estimate the amount of purge, thereby estimating the amount of purge more accurately.

In the speed estimator 50, the current gas diffusion speed may be estimated by multiplying a reference gas diffusion speed at a predetermined temperature by the square root of a ratio of the current gas temperature to a predetermined temperature.

In the speed estimator 50, the current gas diffusion speed may be estimated by dividing the reference gas diffusion speed at a predetermined average molecular weight and the square root of a ratio of a current average molecular weight to a predetermined average molecular weight.

Specifically, the energy (E) of the gas is proportional to the temperature (T) as follows, which may be expressed as the kinetic energy of the molecule.

$$E = \frac{3}{2}kT = \frac{1}{2}m\langle v\rangle^2$$

The energy of the gas may be changed as the temperature of the gas is changed, and may be changed according to the average molecular weight or average speed (gas diffusion speed) of the gas. The gas energy (Es) in a predetermined state as a reference may be as follows. Here, the average molecular weight in the predetermined state is $m_s$, and the gas diffusion speed is $\langle v\rangle_s$.

$$E_s = \frac{3}{2}kT_s = \frac{1}{2}m_s\langle v\rangle_s^2$$

When the state condition such as the temperature of the gas is changed, the following equation may be derived when compared with the gas energy in the predetermined state.

$$\frac{E}{E_s} = \frac{T}{T_s} = \frac{m\langle v\rangle^2}{m_s\langle v\rangle_s^2}$$

The equation is summarized with respect to the gas diffusion speed as follows.

$$\langle v\rangle = \langle v\rangle_s\sqrt{\left(\frac{T}{T_s}\right)\left(\frac{m_s}{m}\right)}$$

That is, the gas diffusion speed $\langle v\rangle$ may be proportional to the square root of the temperature, and inversely proportional to the square root of the average molecular weight.

Accordingly, the current gas diffusion speed may be estimated by multiplying the reference gas diffusion speed at a predetermined temperature by the square root of the ratio of the current gas temperature to the predetermined temperature, and the current gas diffusion speed may be estimated by dividing the reference gas diffusion speed at the predetermined average molecular weight and the square root of the ratio of the current average molecular weight to the predetermined average molecular weight.

In an embodiment, the average molecular weight may be estimated by using the concentration for each gas and the molecular weight for each gas in the recirculation line 20. The concentration for each gas in the recirculation line 20 may use the amount of hydrogen, the amount of nitrogen, and the amount of vapor estimated by the concentration estimator as described later as the concentration for each gas.

The molecular weight for each gas means the mass of one mole of molecules, hydrogen may be about 2.016 g, nitrogen is about 28.016 g and vapor may be about 18.02 g. That is, the average molecular weight may be calculated by multiplying and summing the molecular weight for each gas according to the concentration for each gas.

The predetermined temperature and the predetermined average molecular weight at which the reference diffusion speed is determined may be predetermined to the normal operating state of the fuel cell 10. For example, the reference diffusion speed may be in a state where the hydrogen concentration is 70% at 60° C.

The current gas temperature may be measured directly by using a temperature sensor positioned in the recirculation line 20, and in another embodiment, may be estimated as being the same as the temperature of the fuel cell 10. The temperature of the fuel cell 10 may be indirectly measured by measuring the coolant temperature at the outlet side of the fuel cell 10.

The current average molecular weight may be estimated based on the hydrogen concentration estimated immediately before in the concentration estimator described later.

In the purge amount estimator 60, the amount of purge is estimated as being proportional to the purge rate according to the time obtained by multiplying the differential pressure by the purge gain, and the purge gain may be modified so as to reflect the current gas diffusion speed estimated by the speed estimator 50 to the predetermined gain.

Specifically, the purge rate with time may be expressed as a product of the differential pressure and the purge gain as follows.

$$n_{purge} = C(P_{An} - P_{out})$$

The purge gain (C) is modified to reflect the current gas diffusion speed to the reference purge gain ($C_s$), such that the purge rate with time may be calculated by the following equation $$n_{purge} = \left(C_s\sqrt{\left(\frac{T}{T_s}\right)\left(\frac{m_s}{m}\right)}\right)(P_{An} - P_{out})$$

As another embodiment, the ratio of the average molecular weight may be assumed as being the same as a density ratio of the gas contained in the recirculation line 20. Accordingly, the purge rate with time may be calculated by the following equation.

$$n_{purge} = \left(C_s\sqrt{\left(\frac{T}{T_s}\right)\left(\frac{\rho_s}{\rho}\right)}\right)(P_{An} - P_{out})$$

In addition, accordingly, it is possible to estimate the hydrogen concentration in the recirculation line 20 more accurately.

The present disclosure may further include a purge controller for controlling an opening period, an opening degree, or an opening holding time of the purge valve 30 based on the amount of purge estimated by the purge amount estimator 60.

The purge controller according to an embodiment may control an opening period, an opening degree, or an opening holding time of the purge valve 30 in order to control the amount of purge changed as the gas diffusion speed is changed to be the same as before. Accordingly, the purge gain (C) may be changed.

That is, when the gas diffusion speed is increased, the controller may control to increase the opening period of the purge valve 30, reduce the opening degree of the purge valve 30, or reduce the opening holding time of the purge valve 30 in order to control the amount of purge to be the same.

As a system for estimating hydrogen concentration of the fuel cell 10 using the system for estimating the amount of purge of the fuel cell 10 according to an embodiment of the present disclosure, the present disclosure may include a concentration estimator for estimating hydrogen concentration in the recirculation line 20 based on the amount of purge estimated by the purge amount estimator 60.

The concentration estimator may estimate the hydrogen concentration in the recirculation line 20 based on the total amount of gas in the recirculation line 20, the amount of crossover crossed-over between the anode 11 side and the cathode 12 side of the fuel cell 10, and the amount of purge purged to the outside through the purge valve 30.

The present disclosure may further include a purge controller for controlling an opening period, an opening degree, or an opening holding time of the purge valve 30 based on the hydrogen concentration estimated by the concentration estimator.

It is possible to control the hydrogen supply system so as to maintain the hydrogen concentration in the recirculation line 20 at the target concentration by using the accurate hydrogen concentration, thereby enhancing fuel efficiency and durability.

The detailed configuration of the system for estimating hydrogen concentration of the fuel cell 10 will be described later in the description of a method for estimating hydrogen concentration of the fuel cell 10.

Referring to FIG. 2, a method for estimating hydrogen concentration of the fuel cell 10 according to an embodiment of the present disclosure includes estimating a current gas diffusion speed in the recirculation line 20 for circulating the gas comprising hydrogen to the anode 11 side of the fuel cell 10 (operation S100); estimating the amount of purge through the purge valve 30 connected to the outside in the recirculation line 20 by reflecting the estimated current gas diffusion speed (operation S200); and estimating hydrogen concentration in the recirculation line 20 based on the estimated amount of purge (operation S300).

The estimating the current gas diffusion speed (operation S100) may estimate the current gas diffusion speed by multiplying the square root of a ratio of a reference gas diffusion speed at a predetermined temperature to a predetermined temperature of a current gas temperature.

The estimating the current gas diffusion speed (operation S100) may estimate the current gas diffusion speed by dividing the square root of a ratio of a reference gas diffusion speed at a predetermined average molecular weight to a predetermined average molecular weight of a current average molecular weight.

The current average molecular weight may be estimated by using the concentration for each gas (of a plurality of gases in the recirculation line 20), and the molecular weight for each gas in the recirculation line 20.

The estimating the amount of purge (operation S200) may estimate the amount of purge as being proportional to a purge rate with time calculated by multiplying the differential pressure to a purge gain, and modify the purge gain so as to reflect the current gas diffusion speed estimated by the speed estimator 50 to a predetermined gain.

The estimating the hydrogen concentration (operation S300) may estimate the hydrogen concentration in the recirculation line 20 based on the total amount of gas in the recirculation line 20, the amount of crossover crossed-over between the anode 11 side and the cathode 12 side of the fuel cell 10, and the amount of purge purged to the outside through the purge valve 30.

Specifically, the estimating the hydrogen concentration (operation S300) may estimate the amount of hydrogen in the recirculation line 20 by reducing the amount of nitrogen and the amount of vapor having reflected the amount of crossover and the amount of purge from the total amount of gas in the recirculation line 20.

The total amount of gas ($n_{An}$) in the recirculation line 20 may be estimated by using a gas pressure (P), a volume (V) and a temperature (T) in the recirculation line 20 from the ideal gas state equation as in the following equation $$n_{An} = \frac{P_{An} V_{An}}{RT} [\text{mol}]$$

where, the R refers to a gas constant, and is 8.314 J/molK.

The gas diffusion rate may be inversely proportional to the thickness of the electrolyte membrane of the fuel cell 10 stack, and proportional to the gas partial pressure difference between the anode 11 side and the cathode 12 side. Specifically, the amount of crossover may be calculated by applying the following FICK's LAW (Diffusion Law).

$$\frac{\dot{m}}{A} = -D\frac{\partial c}{\partial x} = -D\frac{M}{RT}\frac{\partial P}{\partial x}$$

where the $\dot{m}$ refers to a mass diffusion rate (g/s) of the gas, the A refers to a diffusion area, the D refers to a gas diffusion coefficient, the x refers to a diffusion distance, the c refers to a gas concentration, the R refers to an universal gas constant (8.314 J/molK), and the P refers to a gas Pressure, the T refers to a gas temperature, and the M refers to the molar mass (g/mol) of the gas. This may be summarized as follows.

$$\dot{m} = -D\frac{M}{RT}\frac{\partial P}{\partial x}A = \dot{n} \cdot M$$

$$\dot{n} = -D\frac{1}{RT}\frac{\partial P}{\partial x}A$$

where the $\dot{n}$ refers to a crossover rate with time (mol/s). The amount of crossover may be calculated by multiplying the crossover rate with time by the time.

That is, the crossover rate crossed-over between the electrolyte membranes of the fuel cell 10 stack may be calculated by the following equation.

$$n_{N2\_xo} = \frac{D_{N2}}{RT} \frac{P_{Ca,N2} - P_{An,N2}}{\delta} A$$

where the $n_{N2\_XO}$ refers to a diffusion rate of nitrogen, the P refers to a pressure in kPa, the R refers to a gas constant, 8.314 J/mol/K, the T refers to a temperature in Kelvin, D refers to a diffusion coefficient, the A refers to an area of an electrolyte membrane, the δ refers to the thickness of an electrolyte membrane, the $P_{Ca,N2}$ refers to a nitrogen partial pressure at the cathode 12 side of the fuel cell 10, the $P_{An,N2}$ refers refers to a nitrogen partial pressure at the anode 11 side of the fuel cell 10.

Conversely, hydrogen may be crossed-over from the anode 11 side of the fuel cell 10 to the cathode 12 side thereof.

$$n_{H2\_xo} = \frac{D_{H2}}{RT} \frac{P_{An,H2} - P_{Ca,H2}}{\delta} A$$

where the $n_{H2\_XO}$ refers to a diffusion rate of hydrogen, the P refers to a pressure in kPa, the R refers to a gas constant, 8.314 J/mol/K, the T refers to a temperature in Kelvin, D refers to a diffusion coefficient, the A refers to an area of an electrolyte membrane, the δ refers to the thickness of an electrolyte membrane, the $P_{An,H2}$ refers to a hydrogen partial pressure at the anode 11 side, the $P_{Ca,H2}$ refers to a hydrogen partial pressure at the cathode 12 side.

In addition, the crossover rate is proportional to the gas diffusion coefficient, and the gas diffusion coefficient (D) may be changed according to the water content and the temperature of the electrolyte membrane positioned between the anode 11 side and the cathode 12 side of the fuel cell 10.

The gas diffusion coefficient (D) may also use a fixed constant value, but in order to further increase accuracy, the gas diffusion coefficient (D) may also use a value changed according to the state of degradation, temperature, etc. of the fuel cell 10. More specifically, the gas diffusion coefficient (D) may be calculated by using a value changed according to the water content and the temperature of the electrolyte membrane positioned between the anode 11 side and the cathode 12 side of the fuel cell 10. In addition, the gas diffusion coefficient (D) may also be calculated as being changed as the electrolyte membrane of the fuel cell 10 stack is deteriorated.

The purge rate for each gas may be specifically calculated by the following equation (a nitrogen purge rate ($n_{N2\_purge}$), a vapor purge rate ($n_{V\_purge}$), a hydrogen purge rate ($n_{H2\_purge}$))

$$n_{N2\_purge} = n_{purge} \cdot \frac{n_{N2}}{n_{An}}$$

$$n_{V\_purge} = n_{purge} \cdot \frac{n_V}{n_{An}}$$

$$n_{H2\_purge} = n_{purge} \cdot \frac{n_{H2}}{n_{An}}$$

The initial amount of nitrogen and the initial amount of stream in the recirculation line 20 may be predicted, respectively. In an embodiment, it is possible to predict the initial amount of nitrogen and the initial amount of vapor at restart by reflecting the hold time, at which a state where power generation has been stopped is maintained, to the amount of nitrogen and the amount of vapor estimated before the power generation of the fuel cell 10 according to the start-off of the fuel cell 10 is stopped.

It is possible to calculate the current amount of nitrogen in the recirculation line 20 based on the amount of nitrogen crossed-over and the amount of nitrogen purged by calculating the initial amount of nitrogen and the amount of nitrogen crossed-over and the amount of nitrogen purged at the anode 11 side, respectively.

In addition, it is possible to calculate the current amount of vapor in the recirculation line 20 based on them by calculating the predicted initial amount of vapor, the amount of vapor crossed-over, and the amount of vapor purged, respectively.

The estimating the hydrogen concentration (operation S300) may estimate the current amount of hydrogen by subtracting the current amount of nitrogen and the current amount of vapor from the total amount of gas in the recirculation line 20. The hydrogen concentration may be estimated by dividing the current amount of hydrogen by the total amount of gas.

After the estimating the hydrogen concentration (operation S300), the present disclosure may further include controlling an opening period, an opening degree, or an opening holding time of the purge valve 30 based on the estimated amount of purge or the estimated hydrogen concentration (operation S400).

Specifically, the controlling (operation S400) may determine whether the estimated hydrogen concentration follows the target hydrogen concentration, and control the purge valve 30 so as to follow the target hydrogen concentration. Specifically, the controlling (operation S400) may control the hydrogen concentration in the recirculation line 20 by varying the amount of purge by controlling the opening period, the opening degree, or the opening holding time of the purge valve 30.

Alternatively, when the estimated hydrogen concentration so that the hydrogen concentration in the recirculation line 20 is maintained within a predetermined range is a predetermined lower limit value, the controlling (operation S400) may control to maintain the opening of the purge valve 30 for a predetermined holding time or to maintain the opening of the purge valve 30 until reaching a predetermined upper limit value.

In another embodiment, the controlling (operation S400) may control the hydrogen concentration in the recirculation line 20 by controlling a hydrogen supply valve or an ejector between a hydrogen tank and the recirculation line 20. That is, when the estimated hydrogen concentration is lower than the target hydrogen concentration, the controlling (operation 400) may control to open the hydrogen supply valve and operate the ejector to supply hydrogen to the recirculation line 20.

Accordingly, it is possible to estimate the hydrogen concentration with improved accuracy, and accordingly, to prevent unnecessary purge and properly control the purge so that the hydrogen concentration is maintained at a certain concentration or more, thereby enhancing fuel economy and enhancing durability of the fuel cell 10 stack.

While it has been illustrated and described with respect to the specific embodiments of the present disclosure, it will be understood by those skilled in the art that various improvements and changes of the present disclosure may be made within the technical spirit of the present disclosure as prepared by the following claims.

What is claimed is:

1. A system for estimating an amount of purge of a fuel cell, comprising:
   the fuel cell for generating power by receiving hydrogen at an anode side, and receiving oxygen at a cathode side;
   a recirculation line connected with the anode side of the fuel cell, and in which gas comprising the hydrogen therein is circulated;
   a purge valve positioned in the recirculation line, and for discharging the gas in the recirculation line to outside as the purge valve is opened;
   a differential pressure calculator for calculating a differential pressure between a front end and a rear end of the purge valve;
   a speed estimator for estimating a current gas diffusion speed in the recirculation line; and
   a purge amount estimator for estimating the amount of purge through the purge valve by using the differential pressure calculated by the differential pressure calculator and the gas diffusion speed estimated by the speed estimator.

2. The system for estimating the amount of purge of the fuel cell according to claim 1,
   wherein the speed estimator estimates the current gas diffusion speed by multiplying a reference gas diffusion speed at a predetermined temperature and a square root of a ratio of a current gas temperature to the predetermined temperature.

3. The system for estimating the amount of purge of the fuel cell according to claim 1,
   wherein the speed estimator estimates the current gas diffusion speed by dividing a reference gas diffusion speed at a predetermined average molecular weight and a square root of a ratio of a current average molecular weight to the predetermined average molecular weight.

4. The system for estimating the amount of purge of the fuel cell according to claim 3,
   wherein the gas comprises a plurality of gases, and the current average molecular weight is estimated by using a concentration for each of the gases and the molecular weight for each of the gases in the recirculation line.

5. The system for estimating the amount of purge of the fuel cell according to claim 1,
   wherein the purge amount estimator estimates the amount of purge as being proportional to a purge rate with time calculated by multiplying the differential pressure by a purge gain, and modifies the purge gain so as to reflect the current gas diffusion speed estimated by the speed estimator to a predetermined gain.

6. The system for estimating the amount of purge of the fuel cell according to claim 1, further comprising a purge controller for controlling an opening period, an opening degree, or an opening holding time of the purge valve based on the amount of purge estimated by the purge amount estimator.

7. A system for estimating hydrogen concentration of a fuel cell, comprising:
   the fuel cell for generating power by receiving hydrogen at an anode side, and receiving oxygen at a cathode side;
   a recirculation line connected with the anode side of the fuel cell, and in which gas comprising the hydrogen therein is circulated;
   a purge valve positioned in the recirculation line, and for discharging the gas in the recirculation line to outside as the purge valve is opened;
   a differential pressure calculator for calculating a differential pressure between a front end and a rear end of the purge valve;
   a speed estimator for estimating a current gas diffusion speed in the recirculation line;
   a purge amount estimator for estimating an amount of purge through the purge valve by using the differential pressure calculated by the differential pressure calculator and the gas diffusion speed estimated by the speed estimator; and
   a concentration estimator for estimating the hydrogen concentration in the recirculation line based on the amount of purge estimated by the purge amount estimator.

8. The system for estimating hydrogen concentration of the fuel cell of claim 7,
   wherein the concentration estimator estimates the hydrogen concentration in the recirculation line based on a total amount of the gas in the recirculation line, an amount of crossover crossed-over between the anode side and the cathode side of the fuel cell, and the amount of purge purged to the outside through the purge valve.

9. The system for estimating hydrogen concentration of the fuel cell of claim 7, further comprising a purge controller for controlling an opening period, an opening degree, or an opening holding time of the purge valve based on the hydrogen concentration estimated by the concentration estimator.

10. A method for estimating hydrogen concentration of a fuel cell, comprising:
    estimating, by a speed estimator, a current gas diffusion speed in a recirculation line for circulating gas comprising hydrogen therein to an anode side of the fuel cell;
    estimating, by a purge amount estimator, an amount of purge through a purge valve connected to outside in the recirculation line by reflecting the estimated current gas diffusion speed; and
    estimating, by a concentration estimator, hydrogen concentration in the recirculation line based on the estimated amount of purge.

11. The method for estimating hydrogen concentration of the fuel cell of claim 10,
    wherein estimating the current gas diffusion speed is carried out by multiplying a reference gas diffusion speed at a predetermined temperature and a square root of a ratio of a current gas temperature to the predetermined temperature.

12. The method for estimating hydrogen concentration of the fuel cell of claim 10,
    wherein estimating the current gas diffusion speed is carried out by dividing a reference gas diffusion speed at a predetermined average molecular weight and a square root of a ratio of a current average molecular weight to the predetermined average molecular weight.

13. The method for estimating hydrogen concentration of the fuel cell of claim 12,
    wherein the gas comprises a plurality of gases, and the current average molecular weight is estimated by using the concentration for each of the gases and the molecular weight for each of the gases in the recirculation line.

14. The method for estimating hydrogen concentration of the fuel cell of claim 10, wherein estimating the amount of purge is carried out such that the amount of purge is proportional to a purge rate with time calculated by multiplying a differential pressure by a purge gain, and the purge gain is modified so as to reflect the current gas diffusion speed estimated by the speed estimator to a predetermined gain.

15. The method for estimating hydrogen concentration of the fuel cell of claim 10,
wherein estimating the hydrogen concentration is carried out based on a total amount of the gas in the recirculation line, an amount of crossover crossed-over between the anode side and a cathode side of the fuel cell, and the amount of purge purged to the outside through the purge valve.

16. The method for estimating hydrogen concentration of the fuel cell of claim 15,
wherein estimating the hydrogen concentration is carried out by reducing an amount of nitrogen and an amount of vapor having reflected the amount of crossover and the amount of purge from the total amount of the gas in the recirculation line.

17. The method for estimating hydrogen concentration of the fuel cell of claim 10, further comprising controlling, after estimating the hydrogen concentration, an opening period, an opening degree, or an opening holding time of the purge valve based on the estimated amount of purge or the estimated hydrogen concentration.

\* \* \* \* \*